(12) United States Patent
Yoshitomi et al.

(10) Patent No.: US 7,288,914 B2
(45) Date of Patent: Oct. 30, 2007

(54) DRIVE WAVE GENERATION CIRCUIT

(75) Inventors: Tetsuya Yoshitomi, Gunma-Ken (JP); Noriaki Okada, Gunma-Ken (JP); Takaaki Ishii, Osaka (JP); Yasuyuki Ueshima, Gunma-Ken (JP); Akira Suzuki, Gunma-Ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/433,751

(22) Filed: May 12, 2006

(65) Prior Publication Data
US 2006/0255685 A1 Nov. 16, 2006

(30) Foreign Application Priority Data
May 12, 2005 (JP) ............................. 2005-140036

(51) Int. Cl.
*H02N 2/02* (2006.01)
(52) U.S. Cl. ....................... 318/603; 318/129; 310/317
(58) Field of Classification Search ................ 318/603, 318/669, 129; 310/311, 317; 326/93; 322/28, 322/59, 86; 348/208.11, 345
See application file for complete search history.

(56) References Cited
U.S. PATENT DOCUMENTS

| 4,316,219 | A | * | 2/1982 | Smith et al. ................ 348/523 |
| 4,369,455 | A | * | 1/1983 | McConica et al. ............ 347/11 |
| 5,155,521 | A | * | 10/1992 | Bell et al. .................... 396/240 |
| 6,313,777 | B1 | * | 11/2001 | Horvat et al. ................ 341/144 |
| 6,476,537 | B1 | * | 11/2002 | Pease et al. ................. 310/317 |
| 2004/0228400 | A1 | * | 11/2004 | Tanaka et al. .............. 375/239 |

OTHER PUBLICATIONS

Yasuhiro Okamoto et al.; "The Development of a Smooth Impact Drive Mechanism (SIDM) Using a Piezoelectric Element"; Konica Minolta Technology Report; vol. 1 (2004), p. 23-26.

* cited by examiner

*Primary Examiner*—Bentsu Ro
(74) *Attorney, Agent, or Firm*—Osha Liang LLP

(57) ABSTRACT

Two standard waves from a standard waveform generation circuit are output via an output gate while being interchanged by a direction selector. The switching operation of the direction selector is controlled by a direction control signal M/I. 200 cycles of the standard waveforms are counted up by a 200-cycle counter. A drive counter is downcounted every 200 cycles, while the drive counter is upcounted in accordance with the number of drive pulses DRIVE. When the count value of the drive counter becomes zero, output from the output gate is thereby stopped. At the time of startup, outputs from the 200-cycle counter are counted so as to output a drive wave in a predetermined number in a predetermined direction.

3 Claims, 5 Drawing Sheets

MOVE TOWARD THE INFINITY DIRECTION

MOVE TOWARD THE MACRO DIRECTION

DRIVE WAVE GENERATION CIRCUIT

CROSS-REFERENCE TO RELATED APPLICATIONS

This application claims priority to Japanese Patent Application No. 2005-140036 filed on May 12, 2005, which is incorporated herein by reference in its entirety.

BACKGROUND OF THE INVENTION

1. Field of the Invention

The present invention relates to a drive wave generation circuit which generates two types of drive waves for driving a piezo actuator.

2. Description of the Related Art

Piezo actuators employing elongation and contraction of a piezo element have been proposed, and have gained attention as ultra-small actuators (KONICA MINOLTA TECHNOLOGY REPORT Vol. 1 (2004), p. 23-26). Such piezo actuators are employed in devices such as cameras which include, for example, a mechanism which drives the image capturing element in order to compensate for shaking of the camera when held by hand, or in a focusing mechanism that moves the camera lens.

In a piezo actuator, a voltage is applied to a piezo element (piezoelectric element) so as to cause elongation and contraction of the element, thereby generating a reciprocating movement of a drive shaft. By employing a configuration such that the moving speed of the drive shaft in one direction differs from the moving speed in the opposite direction (i.e., by causing slow elongation and quick contraction, or vice versa), it is possible to cause movement of a movable object placed in frictional contact with the drive shaft. By employing the elongation and contraction of a piezo element as the drive force, linear movement of an object can be achieved without use of coils or the like, facilitating downsizing of the actuators.

In order to change the moving speed of the drive shaft, voltage waveforms applied to the piezo element must be changed. For example, in order to cause slow elongation and quick contraction, it is necessary to perform voltage application in a pattern in which voltage in a first direction is applied slowly and then voltage in the opposite direction is applied abruptly.

When moving an object such as a lens in a manner as described above using a piezo actuator, reciprocating movement of a drive shaft is caused, and the movable object such as a lens is made to slide with respect to the drive shaft. Accordingly, the absolute position of the lens cannot be determined without providing a lens position detector. Meanwhile, for cameras mounted on a cellular phone or the like, any reduction in size or cost is very desirable.

SUMMARY OF THE INVENTION

According to a circuit of the present invention; two types of drive waves can be output in a predetermined pattern by employing count values of an initial counter. With this arrangement, for example, when a lens is to be moved, the lens can be moved to a mechanical limit position by causing a sufficiently large movement in one direction. Using this limit position as a reference, an initial position of the lens can be determined by means of subsequent movements. In this manner, it is possible to determine the initial position of the lens without using a sensor or the like for detecting lens position. Further, in a circuit according to the present invention, the initial operation is triggered by an enable signal for controlling an operation state of the circuit. Accordingly, a signal specifically for controlling the initial operation is unnecessary and a terminal for such a signal can be eliminated.

PREFERRED EMBODIMENT OF THE INVENTION

Figure 1:
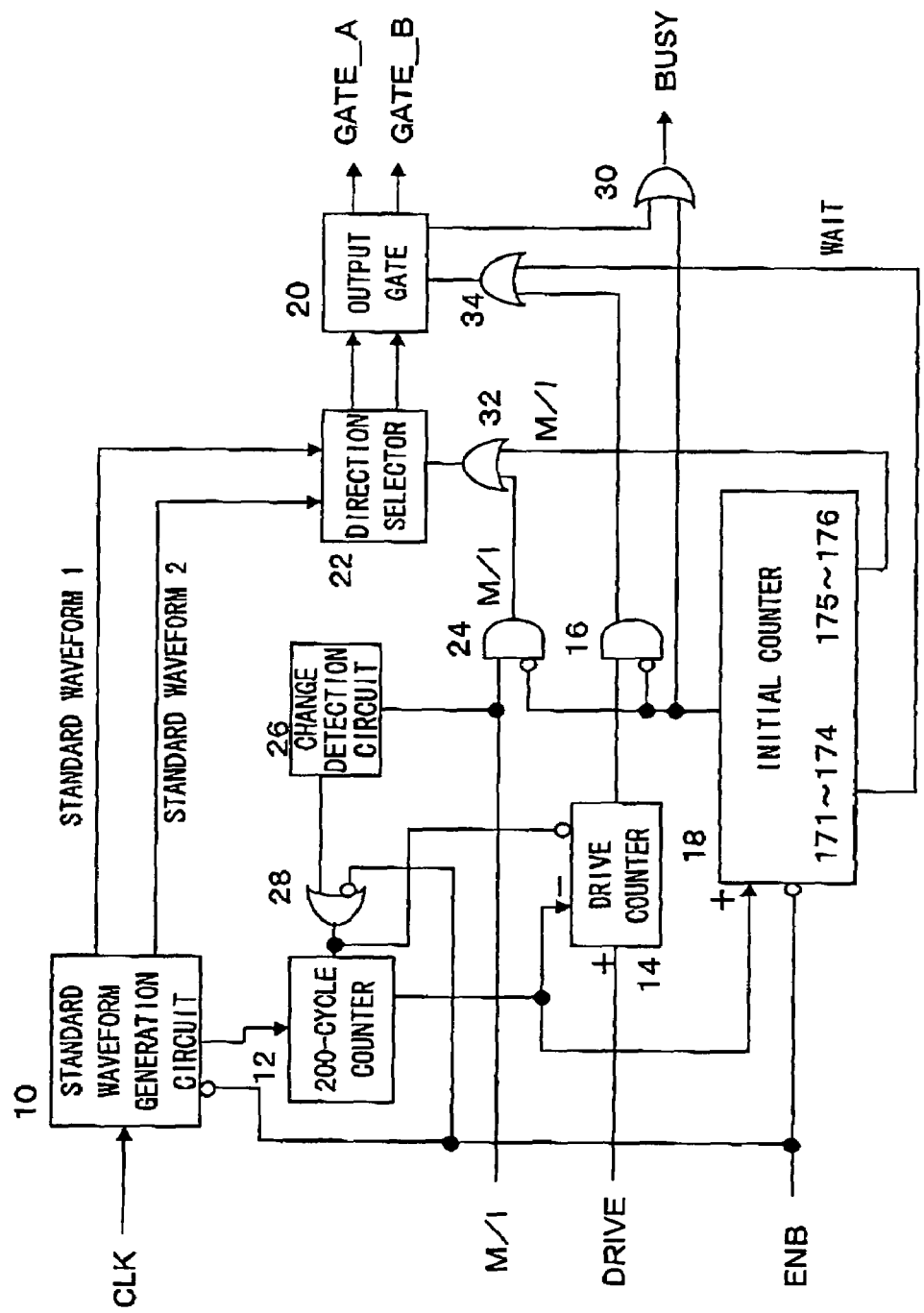
FIG. 1 is a diagram showing an overall configuration of a drive wave generation circuit.

An embodiment of the present invention is next described referring to the drawings.

FIG. 1 is a diagram showing an overall configuration of a drive wave generation circuit. This drive wave generation circuit is formed as one semiconductor integrated circuit, and includes four input terminals for standard clock CLK, direction control signal M/I, drive pulse DRIVE, and enable signal ENB, and three output terminals for GATE_A, GATE_B, and BUSY.

A standard waveform generation circuit 10 outputs two standard waveforms (standard waveform 1 and standard waveform 2) based on the externally-supplied standard clock CLK. For example, the standard waveform generation circuit 10 may include a counter that counts the standard clock for one cycle of the standard waveforms. The two types of the standard waveforms 1, 2 may preferably be generated by creating H levels and L levels by means of logic operations of outputs from a plurality of flip-flops constituting the counter. The standard waveform generation circuit 10 may include a memory storing the two standard waveforms 1, 2, and may read out the two standard waveforms 1, 2 therefrom so as to generate outputs.

Figure 2:
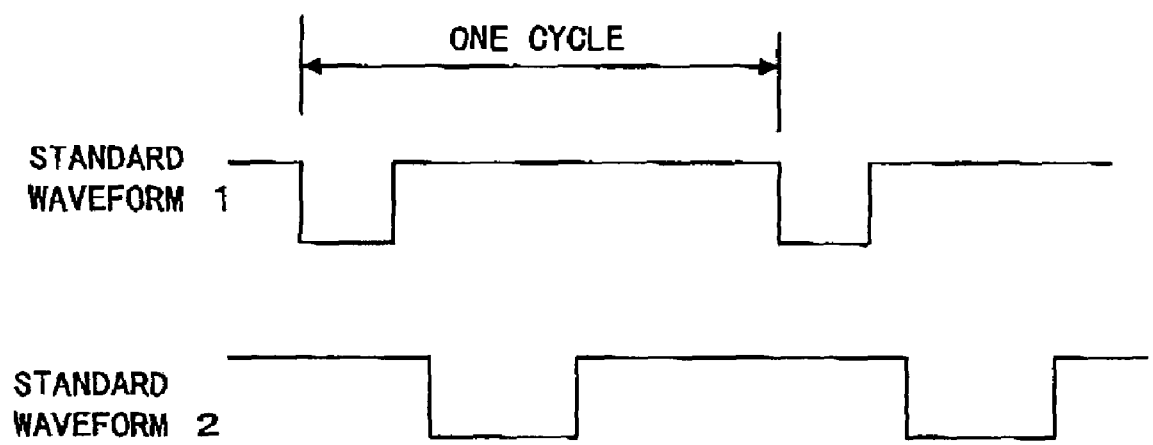
FIG. 2 is a diagram showing waveforms of standard waves.

FIG. 2 shows examples of the standard waveform 1 and the standard waveform 2. For example, when the standard clock CLK has a frequency of 9.75 MHz, one cycle of the standard waveforms 1, 2 may be 134 clocks (=13.74 μsec). In FIG. 2, one cycle of the standard waveform 1 comprises an L level period maintained for 22 clocks, followed by an H level period. On the other hand, one cycle of the standard waveform 2 comprises an H level period for 26 clocks, then an L level period for 46 clocks, followed by an H level period. Accordingly, from the point when the L level period of the standard waveform 1 is completed to the point when the standard waveform 2 becomes L level, there exists a period of 4 clocks in between those two points.

The standard waveform generation circuit 10 outputs a one-cycle pulse for every cycle of the standard waveforms. For example, the output of 134 counts of the counter counting the standard clock may be used as the one-cycle pulse. This one-cycle pulse is supplied to a 200-cycle counter 12. The 200-cycle counter 12 outputs a 200-cycle pulse (unit detection pulse) upon counting 200 one-cycle pulses (one unit).

The 200-cycle pulse is input into a subtraction input terminal of a drive counter 14. The drive counter 14 has an addition input terminal which receives the externally-supplied drive signal DRIVE.

The output of the drive counter 14 is at H level at all times other than when outputting the initial value "0". To achieve this, all outputs from the flip-flops constituting the counter may be subjected to an OR operation, for example. The drive pulses DRIVE may be supplied at a frequency that is sufficiently higher than the 200-cycle pulses, and, by inputting n number of drive pulses DRIVE, the output from the drive counter 14 is maintained at H level until n number of 200-cycle pulses are input.

The output from the drive counter 14 is input into an AND gate 16. The AND gate 16 also receives, at its inverting input terminal, an in-operation signal from an initial counter 18. Accordingly, when the initial counter 18 is not in operation, the AND gate 16 outputs the output of the drive counter 14 without any change. The output from the AND gate 16 is input into a control terminal of an output gate 20.

The standard waveforms 1, 2 generated in the standard waveform generation circuit 10 are input into a direction selector 22. An externally-supplied direction control signal M/I is input into a control terminal of the direction selector 22 via an AND gate 24 and an OR gate 32. The AND gate 24 is also supplied with an inverted input of the in-operation signal of the initial counter 18. Accordingly, when the initial counter 18 is not in operation, the direction control signal M/I is supplied to the control terminal of the direction selector 22 without any change. On the other hand, when the initial counter 18 is in operation, a direction control signal M/I which is an output from the initial counter 18 is supplied to the direction selector 22.

The direction selector 22 outputs the standard waveforms 1 and 2 from two output terminals, respectively, while interchanging the output terminals from which the two waveforms are output in accordance with the direction control signal M/I supplied to the control terminal of the direction selector 22. In the present example, the direction control signal M/I is a signal denoting a movement of a lens to the macro (M) direction or to the infinity (I; ∞) direction supplied from an external microcomputer. When the direction control signal M/I is at L level, the direction selector 22 outputs the standard waveforms 1 and 2 from the two output terminals in a normal manner, thereby creating signals for moving the lens to the infinity (I) direction. On the other hand, when the direction control signal M/I is at H level, the direction selector 22 outputs the standard waveforms 1 and 2 while interchanging the two output terminals, thereby creating signals for moving the lens to the macro (M) direction. The two outputs from the direction selector 22 are output via the output gate 20 as signals GATE_A and GATE_B, so as to move the lens to the infinity direction or the macro direction.

Figure 3:
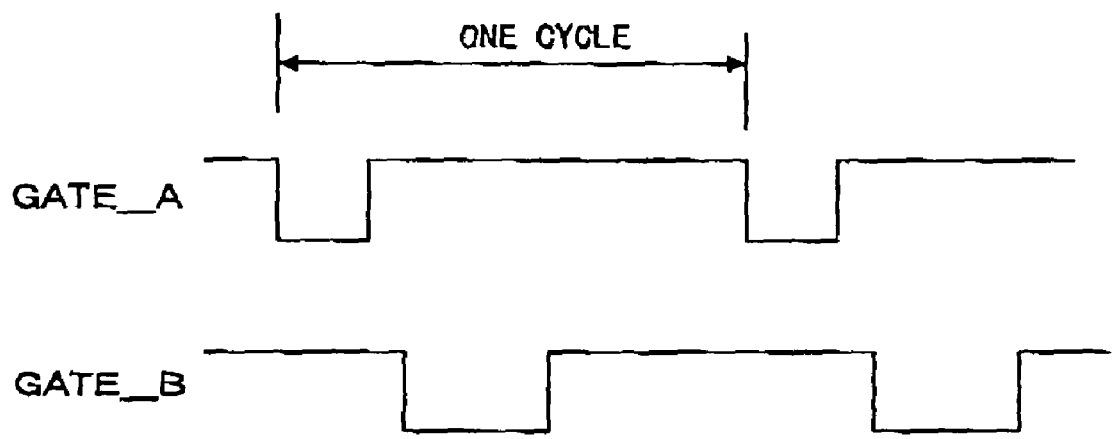
FIG. 3 is a diagram showing waveforms of drive waves.
Figure 3:
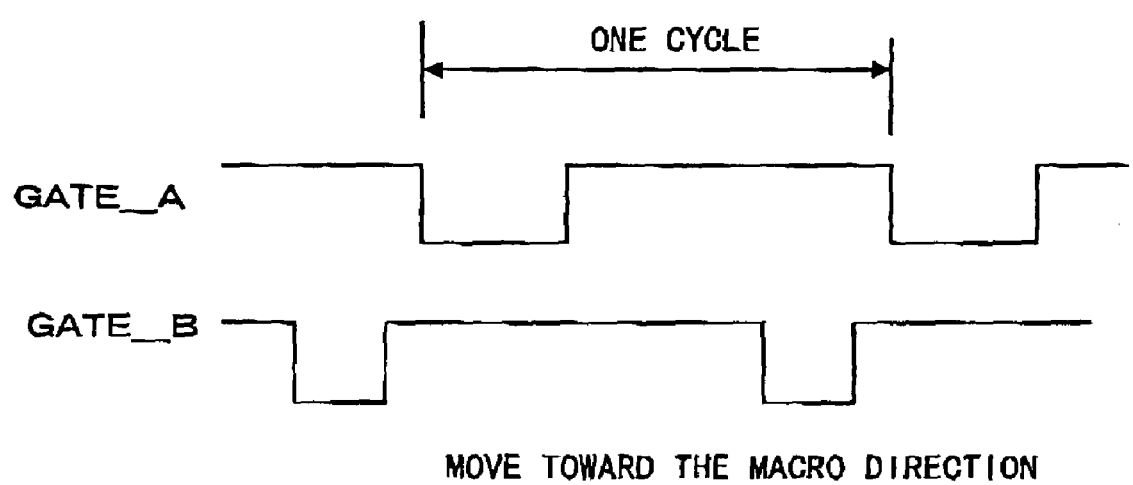

In other words, as shown in FIG. 3, when the direction control signal M/I is at L level (for a movement to the infinity direction), the standard waveforms 1, 2 are output normally as GATE_A and GATE_B, respectively. When the direction control signal M/I is at H level (for a movement to the macro direction), the standard waveform 1 is output as GATE_B, while the standard waveform 2 is output as GATE_A.

Further, the direction control signal M/I is also supplied to a change detection circuit 26. The change detection circuit 26 detects transitions of the direction control signal M/I from L to H and from H to L, so as to output a change detection pulse. The change detection pulse is supplied via an OR gate 28 to a reset terminal of the 200-cycle counter 12. The OR gate 28 also receives the enable signal ENB at its inverting input terminal, such that an H level signal is output from the OR gate 28 also when the enable signal ENB is at L level.

The output from the OR gate 28 is supplied to reset terminals of the 200-cycle counter 12 and the drive counter 14, Accordingly, the 200-cycle counter 12 and the drive counter 14 are reset when the enable signal ENB is at L level, as well as when the state of the direction control signal M/I is switched.

An inverted input of the enable signal ENB is supplied to a reset terminal of the standard waveform generation circuit 10. When the enable signal ENB is at L level, output from the standard waveform generation circuit 10 is prohibited.

The initial counter 18 also receives input of the enable signal ENB. Only once after a transition from L to H of the enable signal ENB, the initial counter 18 counts the 200-cycle pulse up to 176. For example, a completion signal is generated after the initial counter 18 counts up to 176, and this completion signal serves to reset the initial counter 18 and to place the initial counter 18 in a resting state until the next transition of the enable signal ENB from L to H. In this manner, the initial counter 18 counts up to 176 only once for every transition of the enable signal ENB from L to H.

The initial counter 18 outputs an H signal from a 171-174 terminal when the count value is within the range from 171 to 174. This output is supplied to the output gate as a wait (output prohibition) signal. Further, the initial counter 18 outputs from its 175-176 terminal a signal serving as a direction control signal M/I, which is output at H level when the count value is 175 or 176, and at L level when the count value is otherwise. In other words, the initial counter 18 outputs a direction control signal M/I selecting the infinity direction when the count value is between the range from 0 to 174 and selecting the macro direction when the count value is 175 or 176. This direction control signal M/I is supplied to the direction selector 22 via the OR gate 32.

Further, during operation of the initial counter 18, output from the drive counter 14 and output of the externally-supplied direction switching signal M/I are prohibited by the AND gates 16, 24, while the direction selector 22 and the output gate 20 are operated by the outputs from the initial counter 18.

Accordingly, during an initial setting operation when the enable signal ENB is switched from L to H, the initial counter 18 operates to control the direction selector 22 and the output gate 20, such that the direction control signal M/I for a move to the infinity direction is supplied to the direction selector 22 up to the count value "174", and the direction control signal M/I for a move to the macro direction is supplied to the direction selector 22 during the period when the count value is 175 and 176. After that, the externally-supplied direction control signal M/I is supplied to the direction selector 22 without any change.

Furthermore, the output from the AND gate 16 (which is supplied with an inverted signal of the in-operation signal of the initial counter 18 and the output from the drive counter 14) and the in-operation signal of the initial counter 18 are supplied to an OR gate 30, and an output from the OR gate 30 is supplied to outside as a busy signal BUSY. Accordingly, the busy signal BUSY is at H level when the initial counter 18 is in operation as well as when the count value of the drive counter 14 is not "0".

Operations of the above-described drive wave generation circuit are next described.

[Initial Setting Operation]

When power to a camera is turned on in order to use the camera, the microcomputer for controlling camera operation is activated, and the microcomputer initially sets the enable signal ENB to L level. When the enable signal ENB is at L level, reset signals are supplied to the standard waveform generation circuit 10, 200-cycle counter 12, drive counter 14, and initial counter 18, thereby resetting the internal counters and placing the drive wave generation circuit in a resting state. Further, the standard clock CLK is supplied from outside (from the microcomputer). Although the direction control signal M/I and drive pulse DRIVE are unnecessary at this stage, it is preferable to have the drive counter 14 in the reset state.

Subsequently, the microcomputer switches the enable signal ENB from L level to H level. As a result of this transition to H level, operation is started in the standard waveform generation circuit 10, 200-cycle counter 12, drive counter 14, and initial counter 18. At this point, because the in-operation signal from the initial counter 18 is changed to H level, the BUSY signal is switched to H level, and supply of a control signal from the drive counter 14 to the output gate 20 is stopped. In addition, supply of the externally-input direction control signal M/I to the direction selector 22 is stopped by the AND gate 24. Further, the initial counter 18 counts up the 200-cycle pulse output from the 200-cycle counter 12. During this period, an L level signal instructing a movement in the infinity direction is supplied to the direction selector 22 as the direction control signal M/I. When the count value of the initial counter 18 reaches 171, a wait signal is supplied to the output gate 20, thereby prohibiting signal output from the output gate 20. When the count value of the initial counter 18 is 175 or 176, an H level signal is output from the initial counter 18 as the direction control signal M/I, such that the direction selector 22 performs the interchanged output of the standard waveforms 1, 2 for achieving a movement toward the macro direction. The resulting signals are output from the output gate 20.

When the count value reaches 177, an overflow signal is output. As a result, the operation of the initial counter 18 is stopped, and the in-operation signal is switched to L level. The initial setting operation is thereby completed.

For example, it is possible to provide a flip-flop which is set by a transition of the enable signal ENB to H level, and employ an output from this flip-flop to enable operation of the initial counter 18. In this case, the initial counter 18 may be placed in the reset state when this flip-flop is reset by the overflow signal.

As described above, according to the present embodiment, the enable signal ENB denoting whether or not to place the drive wave generation circuit in its operational state is used to perform the initial setting operation. Accordingly, it is unnecessary to input a special control signal for performing the initial setting operation, such that the number of terminals in the drive wave generation circuit can be reduced.

In the present embodiment, the movement toward the infinity direction for one hundred and seventy 200-cycle pulses provides an amount of move sufficient to ensure that the lens, wherever it may be positioned, is moved all the way to the limit position in the infinity direction where the movement is mechanically stopped. Accordingly, as a result of this movement, the lens is placed in a position exceeding the infinity position. Subsequently, after a short wait period, by executing the movement toward the macro direction for two 200-cycle pulses, the lens is reliably positioned in the infinity position. It should be noted that the initial lens position may alternatively be set to the macro position in the opposite direction. Further, by changing the amount of movement executed after the wait period, the lens can be initially set in any desired position. In this manner, the initial position of the lens can be determined without employing a sensor or the like for detecting the lens position.

[Normal Operation]

During normal operation, the standard clock CLK is supplied as normal, and the enable signal ENB is maintained at H level. While in this state, the microcomputer determines the direction and an amount by which the lens should be moved based on focusing information, and supplies to the drive wave generation circuit a direction control signal M/I and drive pulses DRIVE corresponding to the determined move direction and movement amount. The direction control signal M/I is set to H level when the movement is to be executed in the macro direction, while the direction control signal M/I is set to L level when the movement is to be executed in the infinity direction. Further, the drive pulse DRIVE is supplied to the drive counter 14 in a number in accordance with the lens movement amount. In the present embodiment, the movement is effected by means of a piezo element, and application of standard waveforms 1, 2 for two hundred times results in a lens movement of approximately 5 μm. When it is judged that a movement of approximately 50 μm is required, ten drive pulses are sent, such that the value "10" is set as the count value in the drive counter 14. When the value in the drive counter 14 becomes zero as a result of outputs from the 200-cycle counter 12, the "0" output from the drive counter 14 is supplied to the control terminal of the output gate 20 via the AND gate 16, thereby prohibiting output of any drive wave from the output gate 20.

As described above, in the present embodiment, one drive pulse is correlated to 200 cycles of the standard waveforms 1, 2. With this arrangement, the frequency of the drive pulses generated by the microcomputer can be made sufficiently lower than those of the standard waveforms, thereby minimizing the processing load of the microcomputer. Moreover, the processing load of the microcomputer is further reduced because the standard waveforms need not be generated by the microcomputer.

The focusing information may be obtained from luminance information of the incident image, for example. More specifically, the sum of obtained image luminance becomes large when in a focused state. Accordingly, a change in luminance may be detected while moving the lens in one direction, and the focusing information can be obtained from the detected change. When employing this arrangement, it is often preferable to first move the lens excessively in one direction and then cause the lens to move back in the opposite direction so as to place the lens in the optimal position.

In the present embodiment, the 200-cycle counter 12 and the drive counter 14 are reset to "0" when a change in the state of the direction control signal M/I is detected by the change detection circuit 26. Accordingly, the microcomputer may be configured to output 100 drive pulses, for example, so as to move the lens to one direction, and attempt to detect the focus position during this move. When the lens is moved past the focus position, the microcomputer calculates the move-back amount for returning to the focus position and outputs a corresponding number of drive pulses, thereby achieving the focusing operation. Further, when the initial lens move direction is opposite to the desired direction, the movement direction can be readily inverted by switching the direction control signal M/I.

By resetting the drive counter 14 in accordance with the state of change of the direction control signal M/I as described above, freedom in the processing sequence of the microcomputer when performing a focusing operation can be enhanced, making it possible to accomplish appropriate focusing operations. It should be noted that the drive counter 14 alone may be reset without resetting the 200-cycle counter 12.

As such, according to the present embodiment, drive wave generation can be effectively performed by a combination of the direction control signal M/I and the drive pulse DRIVE.

Figure 4:
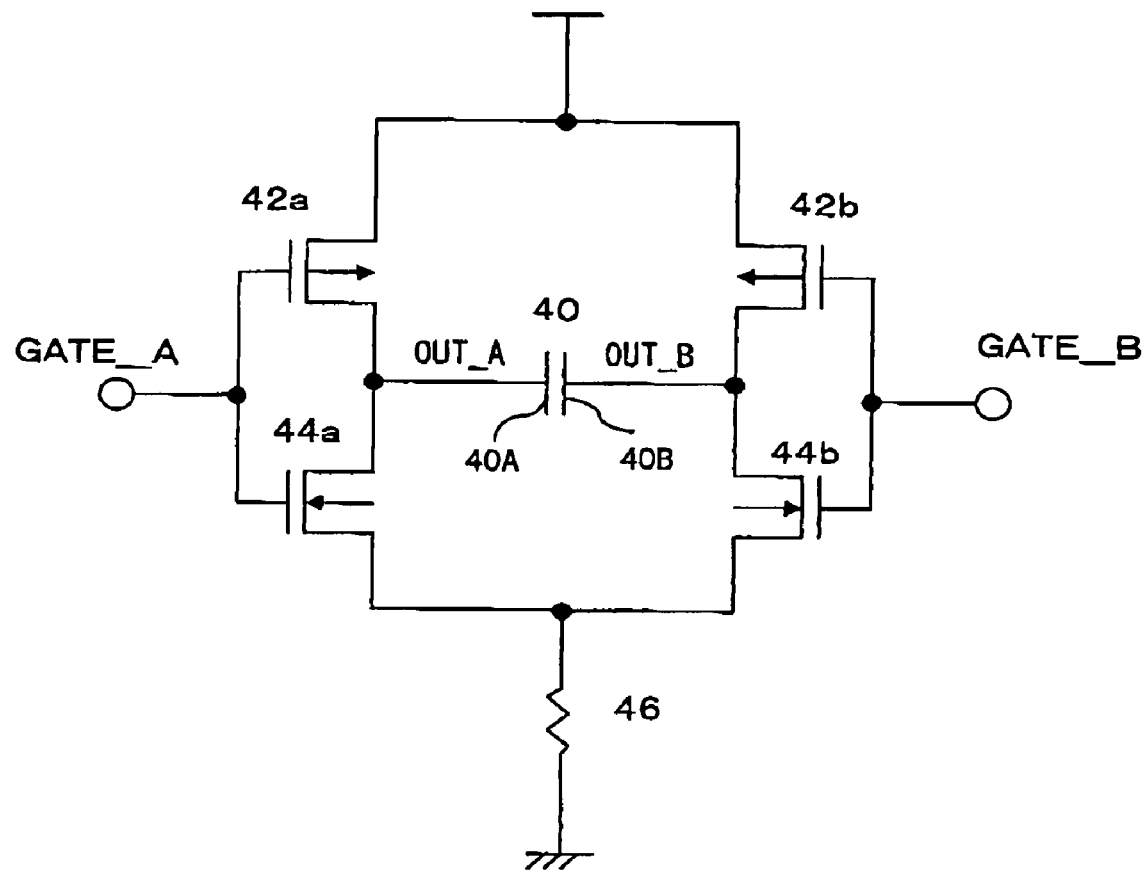
FIG. 4 is a diagram showing a drive circuit of a piezo element.

FIG. 4 shows an example drive circuit of the piezo element. In FIG. 4, the piezo element 40 is illustrated as a capacitor because it can be electrically recognized as a capacitor.

A power source is connected to the sources of two p-channel transistors 42a, 42b. The drains of the transistors 42a, 42b are connected to the drains of n-channel transistors 44a, 44b, respectively. The sources of the transistors 44a, 44b are connected to the ground via a resistor 46. The signal GATE_A is input into the gates of the transistors 42a and 44a, while the signal GATE_B is input into the gates of the transistors 42b and 44b. The piezo element 40 is connected between a connecting point connecting the transistors 42a and 44a and a connecting point connecting the transistors 42b and 44b.

The transistors 42a and 44a constitute an inverter which serves to supply an inverted input of GATE_A to a first terminal of the piezo element 40. The transistors 42b and 44b constitute an inverter which serves to supply an inverted input of GATE_B to the other terminal of the piezo element 40.

Figure 5:
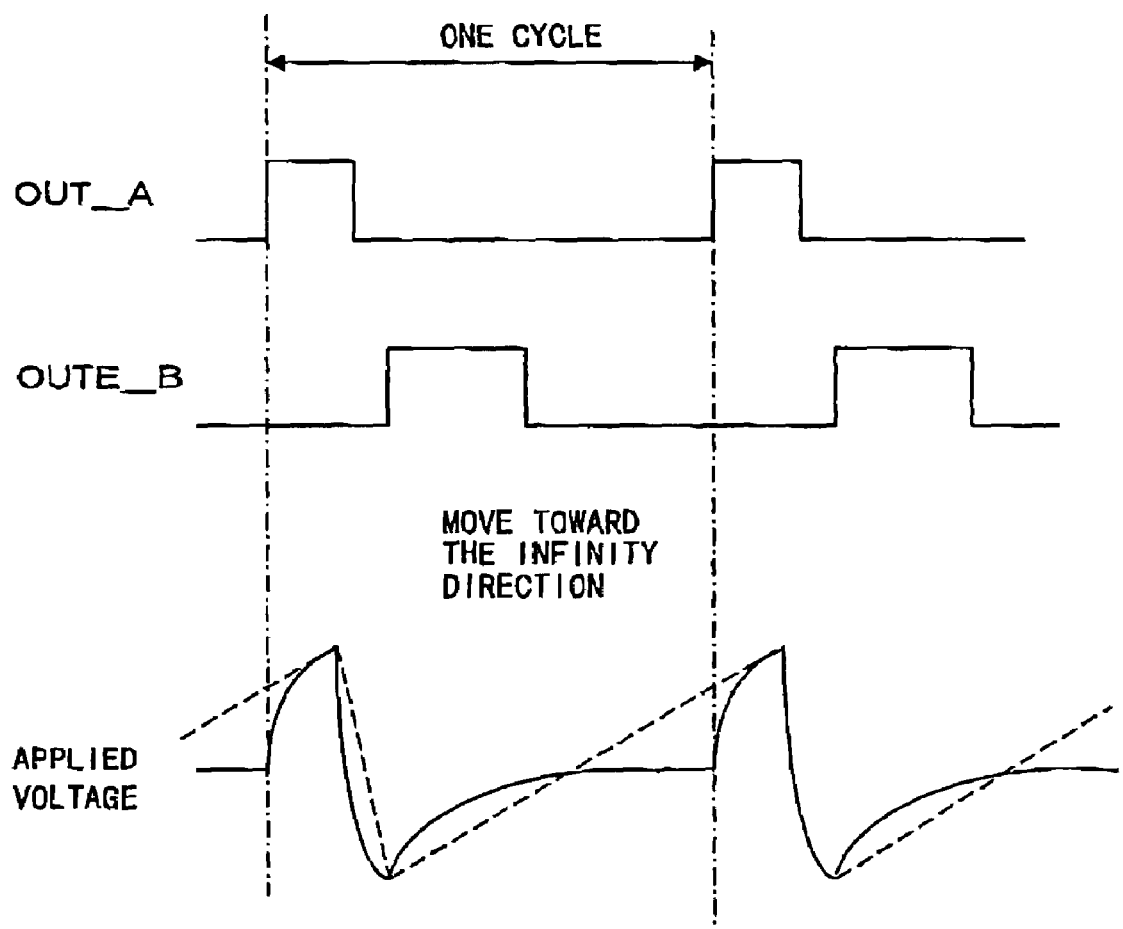
FIG. 5 is a diagram showing a drive waveform of a piezo element.

According to the above arrangement, when the standard waveforms 1, 2 are supplied to the drive circuit as the signals GATE_A and GATE_B, respectively, voltage OUT_A at the first terminal 40A of the piezo element 40 and voltage OUT_B at the other terminal 40B of the piezo element 40 would be caused to vary as shown in FIG. 5. However, although the voltage of the power source is immediately applied to the piezo element 40 when the transistors 42a or 42b is turned on, voltage applied to the piezo element 40 is not immediately changed when the transistors 44a or 44b is turned on because the resistor 46 is connected to the transistors 44a and 44b. Accordingly, the voltage OUT_A at the first terminal 40A of the piezo element 40 is varied relative to the voltage at the other terminal 40B as shown in the bottom of FIG. 5. As a result, as shown by broken lines in the drawing, voltage application to the piezo element 40 can be achieved in sawtooth waveform in which voltage in one direction is abruptly applied and then the voltage is gradually changed to the opposite direction. Accordingly, the piezo element 40 is caused to perform the actions of elongating slowly and contracting quickly (or vice versa). Using this speed difference in elongation and contraction, the lens can be moved.

What is claimed is:

1. A drive wave generation circuit which generates two types of drive waves for driving a piezo actuator, wherein
the drive waves are generated when an input enable signal denotes an enabling state, and generation of the drive waves are disallowed when the input enable signal denotes a disabling state; and
the drive wave generation circuit comprises:
an initial counter which starts counting a clock when the enable signal is changed from the disabling state to the enabling state; and
an initial control circuit which performs control so as to output a first drive wave of the drive waves until a count value of the initial counter reaches a first predetermined value, and to subsequently output a second drive wave of the drive waves until the count value reaches a second predetermined value.

2. A drive wave generation circuit as defined in claim 1, further comprising:
a standard waveform generation circuit which generates, in accordance with a standard clock, two types of standard waveforms having a constant standard cycle, the two standard waveforms having different duty ratios each denoting a proportion of period during which a specific level is maintained within one cycle, the two standard waveforms further having different timings at which the specific level is maintained;
a unit counter which counts each cycle of the standard waveforms, and outputs a unit detection pulse when the counted value reaches a predetermined unit number; and
a direction selector which receives input of the two types of standard waveforms from the standard waveform generation circuit, and interchanges, in accordance with a direction control signal, two output terminals from which the received two types of standard waveforms are output; wherein
the initial counter counts the unit detection pulse as said clock, and the initial control circuit controls the direction selector by generating the direction control signal in accordance with the count value of the initial counter.

3. A drive wave generation circuit as defined in claim 1, wherein
the initial control circuit performs control so as to disallow output of both the first and the second drive waves during a predetermined period immediately after the count value of the initial counter reaches the first predetermined value, and to subsequently output the second drive wave until the count value of the initial counter reaches the second predetermined value.

* * * * *